(12) United States Patent
Takamura et al.

(10) Patent No.: US 9,073,537 B2
(45) Date of Patent: Jul. 7, 2015

(54) CONTROL DEVICE AND CONTROL METHOD FOR CONTINUOUSLY VARIABLE TRANSMISSION

(71) Applicant: JATCO LTD, Fuji-shi, Shizuoka (JP)

(72) Inventors: Takuya Takamura, Fuji (JP); Toshinari Ohde, Sagamihara (JP); Kiyokazu Tanaka, Fuji (JP)

(73) Assignee: JATCO LTD, Fuji-shi (JP)

( * ) Notice: Subject to any disclaimer, the term of this patent is extended or adjusted under 35 U.S.C. 154(b) by 135 days.

(21) Appl. No.: 13/761,422

(22) Filed: Feb. 7, 2013

(65) Prior Publication Data

US 2013/0244833 A1 Sep. 19, 2013

(30) Foreign Application Priority Data

Mar. 19, 2012 (JP) ................. 2012-061774

(51) Int. Cl.
*B60W 10/04* (2006.01)
*B60W 10/101* (2012.01)
*F16H 61/662* (2006.01)
*F16H 59/18* (2006.01)
*F16H 61/16* (2006.01)

(52) U.S. Cl.
CPC ............. *B60W 10/101* (2013.01); *B60W 10/04* (2013.01); *Y10T 477/688* (2015.01); *F16H 61/66259* (2013.01); *F16H 2059/183* (2013.01); *F16H 2061/163* (2013.01)

(58) Field of Classification Search
USPC .................................... 477/44, 115
See application file for complete search history.

(56) References Cited

U.S. PATENT DOCUMENTS

2007/0123385 A1* 5/2007 Shimazu et al. ............... 477/44
2008/0146409 A1* 6/2008 Yamaguchi et al. ............ 477/44
2010/0248895 A1* 9/2010 Jozaki et al. .................. 477/44

* cited by examiner

*Primary Examiner* — Edwin A Young
(74) *Attorney, Agent, or Firm* — Foley & Lardner LLP (57) ABSTRACT

A shift control device is mounted on a vehicle and provided with a shift control unit to control a speed ratio of a continuously variable transmission which continuously shifts and allows output of a rotational speed of a driving power source, wherein the shift control unit executes, based on a driving state of the vehicle, a first shift control for suppressing a change of the speed ratio and a second shift control for upshifting the speed ratio to a predetermined speed ratio, and suppresses a change of the speed ratio in the first shift control, followed by shifting the speed ratio to become lower before execution of the second shift control.

8 Claims, 8 Drawing Sheets

CONTROL DEVICE AND CONTROL METHOD FOR CONTINUOUSLY VARIABLE TRANSMISSION

TECHNICAL FIELD OF THE INVENTION

The present invention relates to a shift control unit for a continuously variable transmission.

BACKGROUND OF THE INVENTION

JP2010-007749A describes that, in the shift control device for a continuously variable transmission which continuously shifts and allows output of rotation of the engine serving as a driving power source, there has been known a control unit which carries out, in response to a demand of sudden acceleration by a driver, a so-called pseudo-stepped upshift control in order to control a speed ratio stepwise so that a vehicle speed increases while repeating a gradual increase and a sudden decrease of the rotational speed of the engine.

SUMMARY OF THE INVENTION

In the pseudo-stepped upshift control made in the conventional continuously variable transmission, a vehicle is accelerated by a linear shift, in which a change of the speed ratio is suppressed, and if the engine rotational speed exceeds a rotational speed set for upshift determination, an upshift control is carried out. By increasing a vehicle speed while repeating a linear shift and an upshift control, a pseudo-stepped upshift control is realized.

Meanwhile, torque which can be generated by the engine is dependent on a rotational speed of the engine. Engine torque is characterized by increasing along with an increase of the rotational speed before reaching a predetermined rotational speed and decreasing in response to a speed equal to or more than the predetermined rotational speed (see JP2010-007749A, FIG. 6).

Here, if an engine rotational speed Ne is increased by applying a linear shift with suppression of a speed ratio change as stated above, engine torque will decrease in repose to the engine rotational speed which exceeds a predetermined rotational speed, causing a sense of incompatibility to a driver in which he/she cannot feel a sense of acceleration. On the other hand, for removing a sense of incompatibility felt by a driver, an upshift control has been carried out in a conventional method when the engine rotational speed falls in a predetermined rotational speed so as to prevent the engine rotational speed from falling in and exceeding a predetermined rotational speed.

However, in such a control, a predetermined rotational speed is set as a ceiling of the engine rotational speed when a vehicle is accelerated, which is problematic.

That is, when acceleration demanded by a driver is large such that the amount of stepping on an accelerator pedal is large, the engine rotational speed is upshifted to a predetermined rotational speed and it is therefore impossible to use the engine rotational speed in a much higher range (e.g. in a range immediately before over-revolution). That is, a period of time to continue a driving state in which a vehicle speed increases along with an increase of the engine rotational speed is made shorter without giving a sufficient sense of acceleration to a driver, whereby resulting in reduction of acceleration feeling.

The present invention was achieved in view of the above problems and aims at providing a control device for continuously variable transmission with an improved sense of acceleration given to a driver.

According to one embodiment of the present invention, a shift control device is mounted on a vehicle and provided with a shift control unit for controlling the speed ratio of a continuously variable transmission which continuously shifts and allows output of the rotational speed of a driving power source, wherein the shift control unit executes, based on a driving state of the vehicle, a first shift control for suppressing a change of the speed ratio and a second shift control for upshifting the speed ratio to a predetermined speed ratio, and suppresses a change of the speed ratio in the first shift control, followed by shifting the speed ratio to become lower before making a transition to the second shift control.

The details as well as other features and advantages of this invention are set forth in the remainder of the specification and are shown in the accompanying drawings.

DESCRIPTION OF THE PREFERRED EMBODIMENTS

Explained below will be an embodiment of the present invention with reference to accompanying drawings. In the following explanation, a "speed ratio" in a shift mechanism is a value obtained by dividing a rotational speed inputted to the shift mechanism by a rotational speed outputted from the shift mechanism. The "lowest speed ratio" means a maximum speed ratio of the shift mechanism and the "highest speed ratio" means a minimum speed ratio of the shift mechanism.

Figure 1:
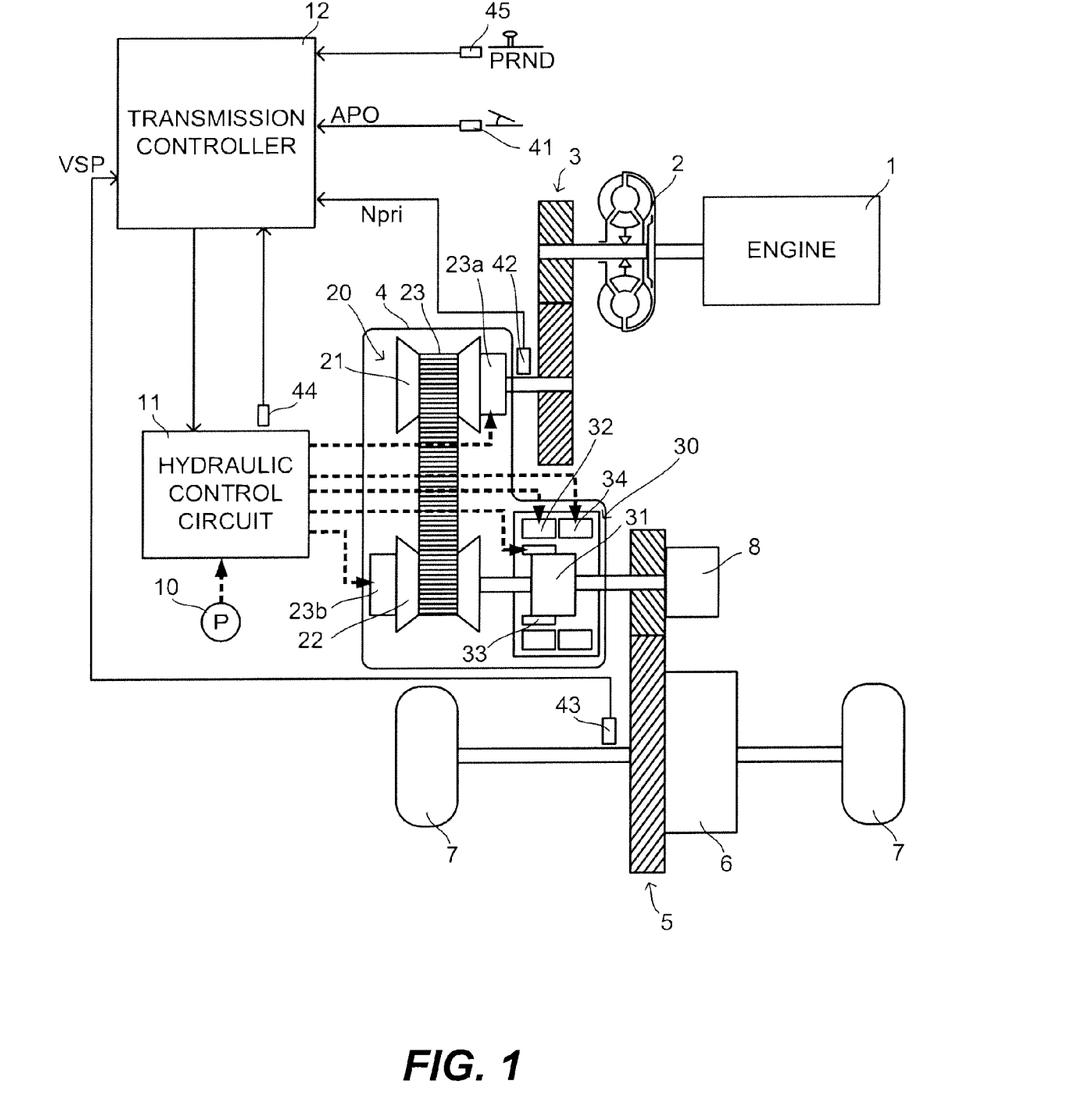
FIG. 1 is a schematic configuration diagram of a vehicle equipped with a control device for a continuously variable transmission according to the present embodiment is mounted.

FIG. 1 is a schematic configuration diagram of a vehicle equipped with a control device for a continuously variable transmission according to the present embodiment is mounted. The vehicle is provided with an engine 1 serving as a power source. Output rotation of the engine 1 is transmitted to driving wheels 7 via a torque converter 2 having a lock-up clutch, a first gear train 3, a continuously variable transmission (simply referred to as a "transmission 4" hereinafter), a second gear train 5 and a final reduction gear 6. The second gear train 5 is provided with a parking mechanism 8 by which an output shaft of the transmission 4 is mechanically locked to be non-rotatable in parking.

The vehicle is provided with an oil pump 10 which is driven by using a part of power of the engine 1, a hydraulic control circuit 11 for regulating an oil pressure received from the oil pump 10 and supplying to each unit of the transmission 4, and a transmission controller 12 for controlling the hydraulic control circuit 11.

Each component will be explained as follows. The transmission 4 is provided with a continuously variable transmission mechanism (referred to as a "variator 20" hereinafter), and an auxiliary transmission mechanism 30 arranged in series to the variator 20. The expression "arranged in series" means serial arrangement of the variator 20 and the auxiliary transmission mechanism 30 on the same power transmission path. The auxiliary transmission mechanism 30 may be directly connected to an output shaft of the variator 20 as shown in this example or may also be connected thereto via another shift or power transmitting mechanism (e.g. gear train).

The variator 20 is a belt-type continuously variable transmission mechanism, including a primary pulley 21, a secondary pulley 22 and a V belt 23 which is wound around these pulleys 21 and 22. Each of the pulleys 21 and 22 has a fixed conical plate, movable conical plates arranged by making sheave surfaces to oppose the fixed conical plate so as to form V grooves in a space created with the fixed conical plate, and a hydraulic cylinder 23a or 23b arranged on a rear surface of the movable conical plate to allow displacement of the movable conical plates in the shaft direction. By adjusting an oil pressure supplied to the hydraulic cylinders 23a and 23b, the width of the V grooves is varied to change a contact radius between the V belt 23 and each of the pulleys 21 and 22, whereby allowing a continuous change of a speed ratio vRatio of the variator 20.

The auxiliary transmission mechanism 30 is a transmission mechanism to realize two forward stages and one reverse stage. The auxiliary transmission mechanism 30 is provided with a Ravigneaux-type planetary gear mechanism 31 in which two planetary gear carriers are connected to each other, and a plurality of friction engagement elements (i.e. a Low brake 32, a High clutch 33 and a Rev brake 34) that are connected to a plurality of rotating elements to constitute the Ravigneaux-type planetary gear mechanism 31 and change a linkage of these rotating elements. By adjusting an oil pressure supplied to each of the friction engagement elements 32 to 34 and making a change in the engaged/released state of each of the friction engagement elements 32 to 34, a shift stage is changed in the auxiliary transmission mechanism 30. For example, by fastening the Low brake 32 and releasing the High clutch 33 and the Rev brake 34, the shift stage of the auxiliary transmission mechanism 30 is brought into a first speed. By fastening the High clutch 33 and releasing the Low brake 32 and the Rev brake 34, the shift stage of the auxiliary transmission mechanism 30 is brought into a second speed whose speed ratio is less than that of the first speed. By fastening the Rev brake 34 and releasing the Low brake 32 and the High clutch 33, the shift stage of the auxiliary transmission mechanism 30 is reversed.

Figure 2:
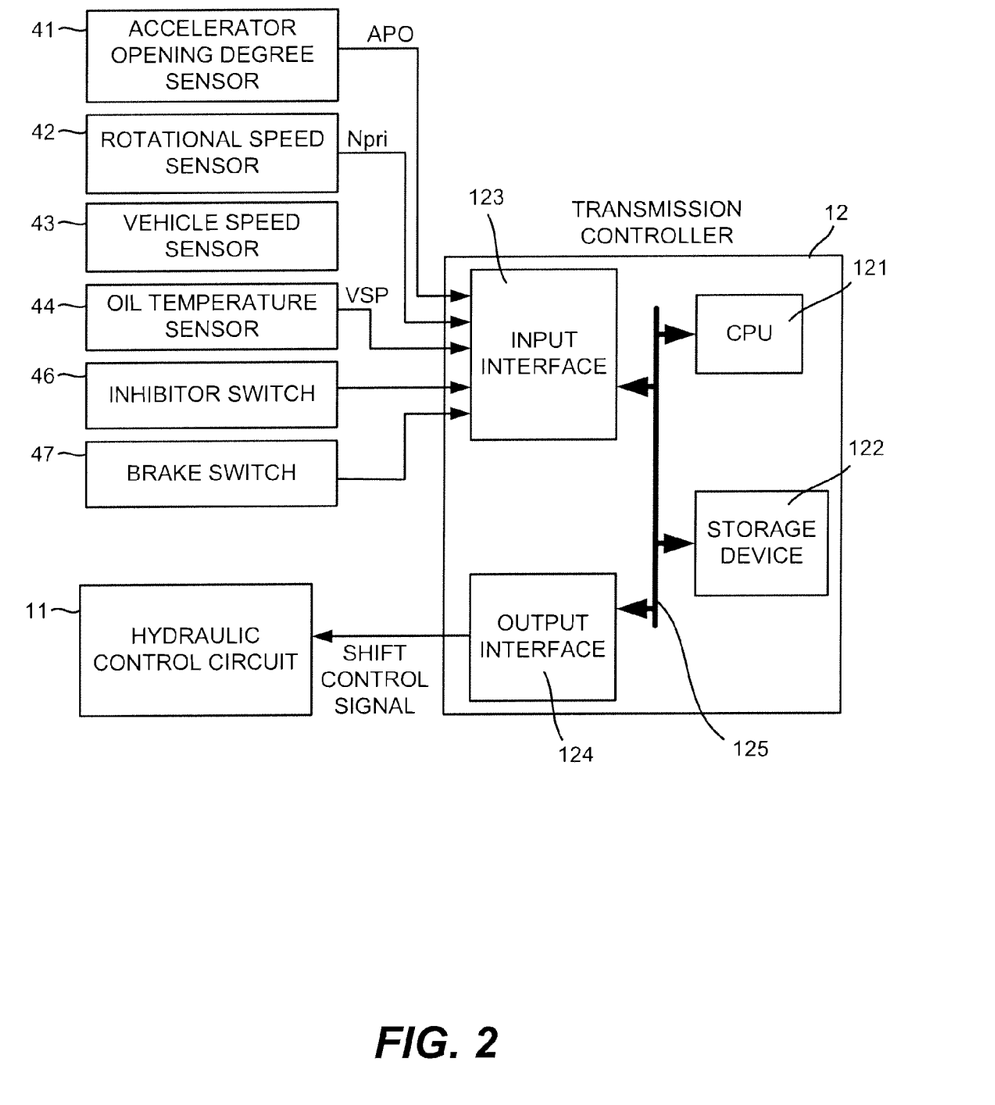
FIG. 2 is an explanatory diagram showing an example of a structure of a transmission control device according to the embodiment of the present invention.

As shown in FIG. 2, the transmission controller 12 is composed of a CPU 121, a storage device 122 made of RAM/ROM, an input interface 123, an output interface 124 and a bus 125 by which these components are connected to each other.

The input interface 123 receives a signal outputted from an accelerator opening degree sensor 41 for detecting the degree of opening of an accelerator pedal (referred to as an "accelerator opening degree APO" hereinafter), a signal outputted from a rotational speed sensor 42 for detecting a rotational speed inputted to the transmission 4 (which is equal to a rotational speed of the primary pulley 21 and referred to as a "primary rotational speed Npri" hereinafter), a signal outputted from a vehicle speed sensor 43 for detecting a running speed of the vehicle (referred to as a "vehicle speed VSP" hereinafter), a signal outputted from an oil temperature sensor 44 for detecting an oil temperature of the transmission 4, and a signal outputted from an inhibitor switch 46 for detecting the position of a select lever, or other signals.

The storage device 122 stores a shift control program for the transmission 4 and a shift map used in the shift control program. The CPU 121 reads and executes the shift control program stored in the storage device 122, generates shift control signals by applying various kinds of arithmetic processes to various kinds of signals inputted via the input interface 123, and outputs generated shift control signals to the hydraulic control circuit 11 via the output interface 124. Various kinds of values used by the CPU 121 in arithmetic processes and arithmetic results obtained therefrom are appropriately stored in the storage device 122.

The hydraulic control circuit 11 is composed of a plurality of flow paths and a plurality of hydraulic control valves. Based on a shift control signal sent from the transmission controller 12, the hydraulic control circuit 11 switches paths to supply an oil pressure by controlling the plurality of the hydraulic control valves, and prepares a required oil pressure from an oil pressure generated in the oil pump 10 in order to supply to each unit of the transmission 4. Therefore, the speed ratio vRatio of the variator 20 and the shift stage of the auxiliary transmission mechanism 30 are varied to shift the transmission 4.

Figure 3:
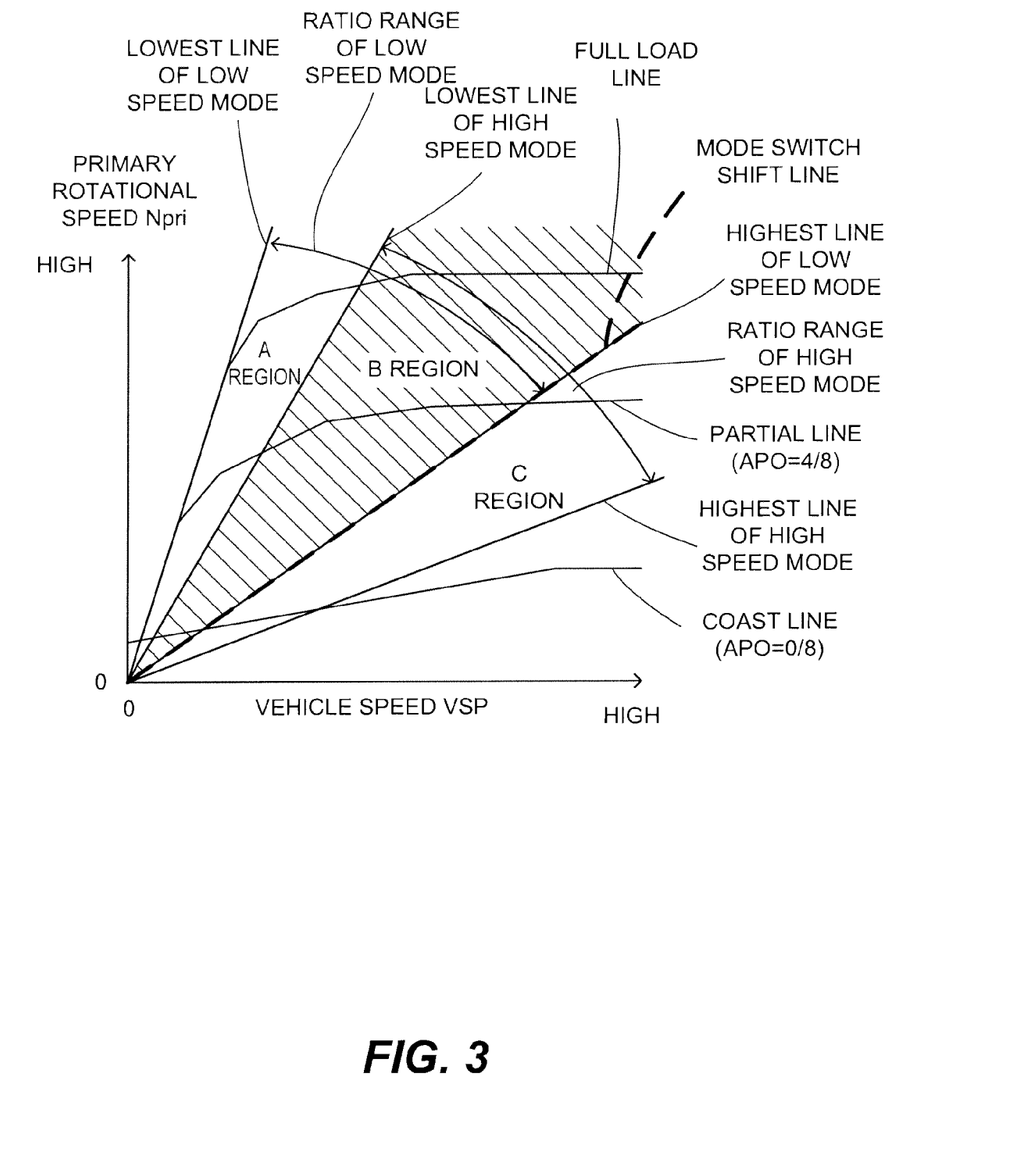
FIG. 3 is an explanatory diagram showing an example of a shift map according to the embodiment of the present invention.

FIG. 3 shows an example of the shift map stored in the storage device 122 of the transmission controller 12.

On the shift map, an operating point of the transmission 4 is determined based on the vehicle speed VSP and the primary rotational speed Npri. The inclination made by a line to connect an operating point of the transmission 4 and zero point at the bottom left corner of the shift map expresses a speed ratio of the transmission 4 (i.e. an entire speed ratio obtained by multiplying a speed ratio subRatio of the auxiliary transmission mechanism 30 to the speed ratio vRatio of the variator 20, referred to as a "through speed ratio Ratio" hereinafter). The shift map includes, similar to the shift map of the conventional belt-type continuously variable transmission, a shift line set for each value of the accelerator opening degree APO and the transmission 4 is shifted according to a shift line which is selected in proportion to the accelerator opening degree APO. For simplification, FIG. 3 includes only a full load line (i.e. shift line obtained when the accelerator opening degree APO falls in 8/8), a partial line (i.e. shift line obtained when the accelerator opening degree APO falls in 4/8) and a coast line (i.e. shift line obtained when the accelerator opening degree APO falls in 0).

When the transmission 4 operates in a low speed mode, the transmission 4 can be shifted in a range between the lowest line of the low speed mode, which is obtained by setting the speed ratio vRatio of the variator 20 to a maximum degree, and the highest line of the low speed mode, which is obtained by setting the speed ratio vRatio of the variator 20 to a minimum degree. At this time, the transmission 4 has an operating point which moves within A region and B region. In contrast, when the transmission 4 operates in a high speed mode, the transmission 4 can be shifted in a range between the lowest line of the high speed mode, which is obtained by setting the speed ratio vRatio of the variator 20 to a maximum degree, and the highest line of the high speed mode, which is obtained by setting the speed ratio vRatio of the variator 20 to a minimum degree. At this time, the transmission 4 has an operating point which moves within B region and C region.

A speed ratio in each shift stage of the auxiliary transmission mechanism 30 is set so that a speed ratio corresponding to the highest line of the low speed mode (i.e. highest speed ratio in the low speed mode) is less than a speed ratio corresponding to the lowest line of the high speed mode (i.e. lowest speed ratio in the high speed mode). Therefore, a low speed mode ratio range which is a range allowed for the through speed ratio Ratio of the transmission 4 to occupy in the low speed mode is partially overlapped by a high speed mode ratio range which is a range allowed for the through speed ratio Ratio of the transmission 4 to occupy in the high speed mode and when an operating point of the transmission 4 falls in the B region which is interposed between the lowest line of the high speed mode and the highest line of the low speed mode, the transmission 4 is allowed to select either the low speed mode or the high speed mode.

The transmission controller 12 refers to the shift map to set the through speed ratio Ratio corresponding to the vehicle speed VSP and the accelerator opening degree APO (i.e. driving state of the vehicle) as an achieving through speed ratio DRatio. The achieving through speed ratio DRatio is a target value to be finally achieved by the through speed ratio Ratio in the driving state. Then, the transmission controller 12 sets a target through speed ratio tRatio which is a transient target value for use in allowing the through speed ratio Ratio to follow the achieving through speed ratio DRatio corresponding to desired response characteristics, and controls the variator 20 and the auxiliary transmission mechanism 30 so that the through speed ratio Ratio coincides with the target through speed ratio tRatio.

A mode switch shift line for use in shifting the auxiliary transmission mechanism 30 (i.e. shift line 1-2 of the auxiliary transmission mechanism 30) is set to overlap highest line of the low speed mode on the shift map. A through speed ratio corresponding to the mode switch shift line (referred to as a "mode switch speed ratio mRatio" hereinafter) is equal to the highest speed ratio in the low speed mode.

Then, when an operating point of the transmission 4 crosses the mode switch shift line or when the through speed ratio Ratio of the transmission 4 is varied across the mode switch speed ratio mRatio, the transmission controller 12 carries out a mode switch shift control. In the mode switch shift control, the transmission controller 12 shifts the auxiliary transmission mechanism 30 and carries out a coordinated shift to change the speed ratio vRatio of the variator 20 to a direction opposite to a direction to which the speed ratio subRatio of the auxiliary transmission mechanism 30 is varied.

In the coordinated shift, when the through speed ratio Ratio of the transmission 4 is brought into a state of being less than the mode switch speed ratio mRatio from a state of being larger than that, the transmission controller 12 changes the shift stage of the auxiliary transmission mechanism 30 from the first speed to the second speed (referred to as a "1-2 shift" hereinafter) and changes the speed ratio vRatio of the variator 20 to become a larger speed ratio. In contrast, when the through speed ratio Ratio of the transmission 4 is brought into a state of being larger than the mode switch speed ratio mRatio from a state of being less than that, the transmission controller 12 changes the shift stage of the auxiliary transmission mechanism 30 from the second speed to the first speed (referred to as a "2-1 shift" hereinafter) and changes the speed ratio vRatio of the variator 20 to become a smaller variation ratio.

The reason why the coordinated shift is carried out in the mode switch shifting is to suppress a sense of incompatibility felt by a driver resulting from a change of inputted rotation caused by a stage difference of the through speed ratio Ratio of the transmission 4. The reason why the mode switch shifting is carried out when the speed ratio vRatio of the variator 20 falls in the highest speed ratio is because torque inputted to the auxiliary transmission mechanism 30 is at the minimum in this state under torque inputted to the variator 20 at this time and shifting the auxiliary transmission mechanism 30 in this state makes it possible to alleviate a shift shock of the auxiliary transmission mechanism 30.

According to the shift map, when the vehicle is parked, the speed ratio vRatio of the variator 20 is brought into the lowest speed ratio and the shift stage of the auxiliary transmission mechanism 30 is set to the first speed.

Next, a shift control executed by the transmission controller 12 in response to an acceleration demand by a driver will be explained.

The transmission controller 12 sets, based on inputs such as the vehicle speed VSP, the primary rotational speed Npri and the accelerator opening degree APO, with reference to the shift map shown in FIG. 3, the target through speed ratio tRatio which is a transient target value to allow the through speed ratio Ratio to follow the achieving through speed ratio DRatio corresponding to desired response characteristics, and controls the variator 20 and the auxiliary transmission mechanism 30 so that the through speed ratio Ratio coincides with the target through speed ratio tRatio.

Here, explanation will be made for a control executed by the transmission controller 12 when acceleration is demanded by a driver in the case, for example, that an accelerator pedal is stepped on significantly by a driver.

In the embodiment of the present invention, as will be explained later, a shift control made in response to an acceleration demand by a driver is realized by repeating a control for suppressing a change of the speed ratio (i.e. first shift control) and a control for upshifting the speed ratio stepwise (i.e. second shift control), wherein a time variation of the engine rotational speed Nc (or the primary rotational speed Npri) follows a jagged track. Such a shift control is referred to as a "jagged shift" hereinafter.

Figure 4:
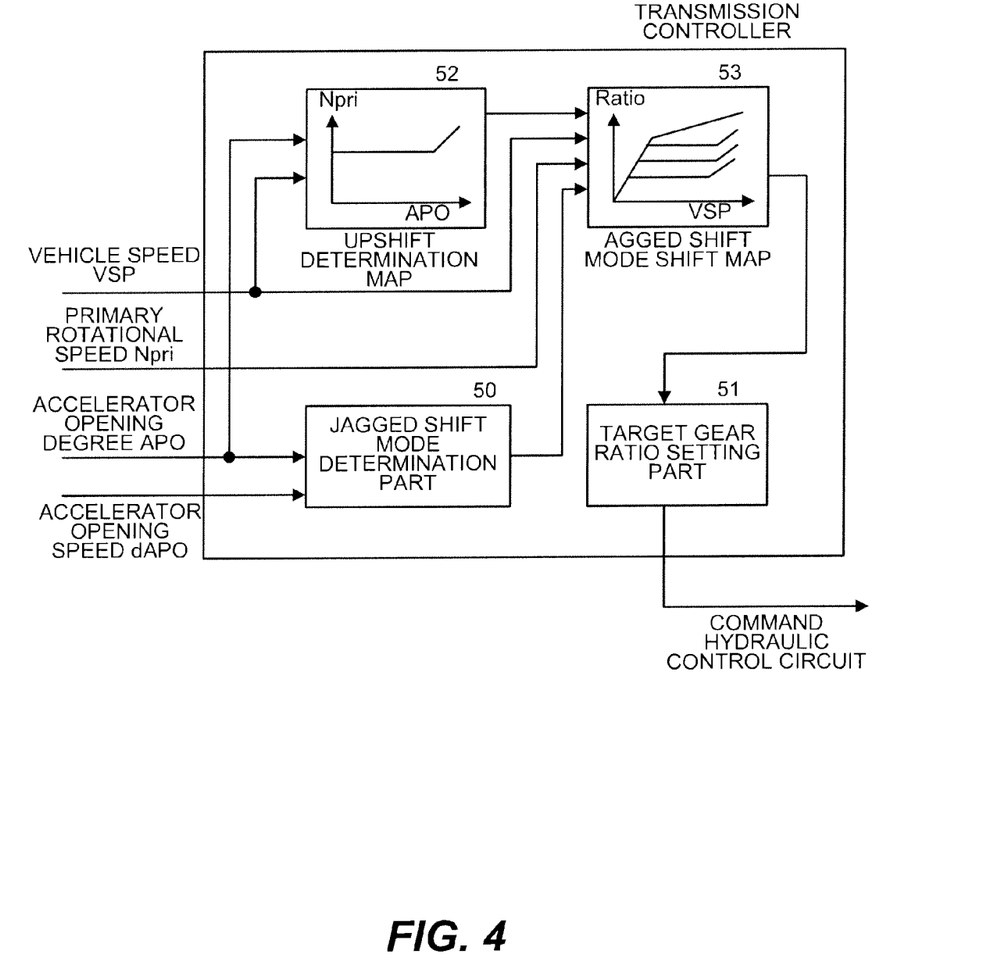
FIG. 4 is a control block diagram of a jagged shift mode control to be executed by the transmission control device according to the embodiment of the present invention.

FIG. 4 is a block diagram of a shift control made by the transmission controller 12 according to the embodiment of the present invention, in which only a portion relating to the present invention is illustrated.

The transmission controller 12 is provided with a jagged shift mode determination unit 50, a target speed ratio setting unit 51, an upshift determination map 52 and a jagged shift mode shift map 53.

The transmission controller 12 receives the vehicle speed VSP, the primary rotational speed Npri, the accelerator opening degree APO and an accelerator opening speed dAPO. For the accelerator opening speed dAPO, the transmission controller 12 calculates a value by differentiating the accelerator opening degree by time.

When a driver steps on an accelerator pedal significantly with the intension of sudden acceleration or, for example, when the accelerator opening degree APO and the accelerator opening speed dAPO are increased, the jagged shift mode determination unit 50 of the transmission controller 12 gives a judgment about an acceleration demand by a driver and determines a jagged shift mode to be explained later.

When the jagged shift mode is determined, the transmission controller 12 makes a shift control based on the jagged shift mode shift map 53 and the upshift determination map 52, instead of the shift map shown in FIG. 3. The target speed ratio setting unit 51 of the transmission controller 12 sets the target through speed ratio tRatio based on these maps. The transmission controller 12 commands the hydraulic control circuit 11 to set the through speed ratio Ratio to coincide with the target through speed ratio tRatio, and controls the speed ratios of the variator 20 and the auxiliary transmission mechanism 30.

Next, details of the jagged shift mode will be explained.

When acceleration is intended by a driver, the engine rotational speed Ne increases due to an increase of the accelerator opening degree APO, wherein the transmission 4 which is controlled by the hydraulic control circuit requires prolonged time to set the through speed ratio Ratio to follow the target through speed ratio tRatio and the vehicle speed VSP increases slowly out of proportion to an increase of the engine rotational speed Ne, giving a driver a sense of incompatibility.

In order to prevent this sense of incompatibility and give a nimble sense of acceleration to a driver, when acceleration intended by a driver is large, the transmission controller 12 refers to the jagged shift mode shift map 53 and sets the through speed ratio Ratio of the transmission 4 to be substantially constant with a current actual speed ratio or the like for suppression of a change of the speed ratio, and executes the first shift control to realize an increase of the vehicle speed VSP in accordance with an increase of the engine rotational speed Ne. By the first shift control made to suppress a change of the speed ratio, the vehicle speed VSP increases in accordance with an increase of the engine rotational speed Ne, whereby giving a sense of acceleration to a driver.

Here, output torque of the engine 1 is characterized by decreasing as opposed to an increase of the engine rotational speed in a range in which the engine rotational speed Ne exceeds a predetermined rotational speed.

Figure 5:
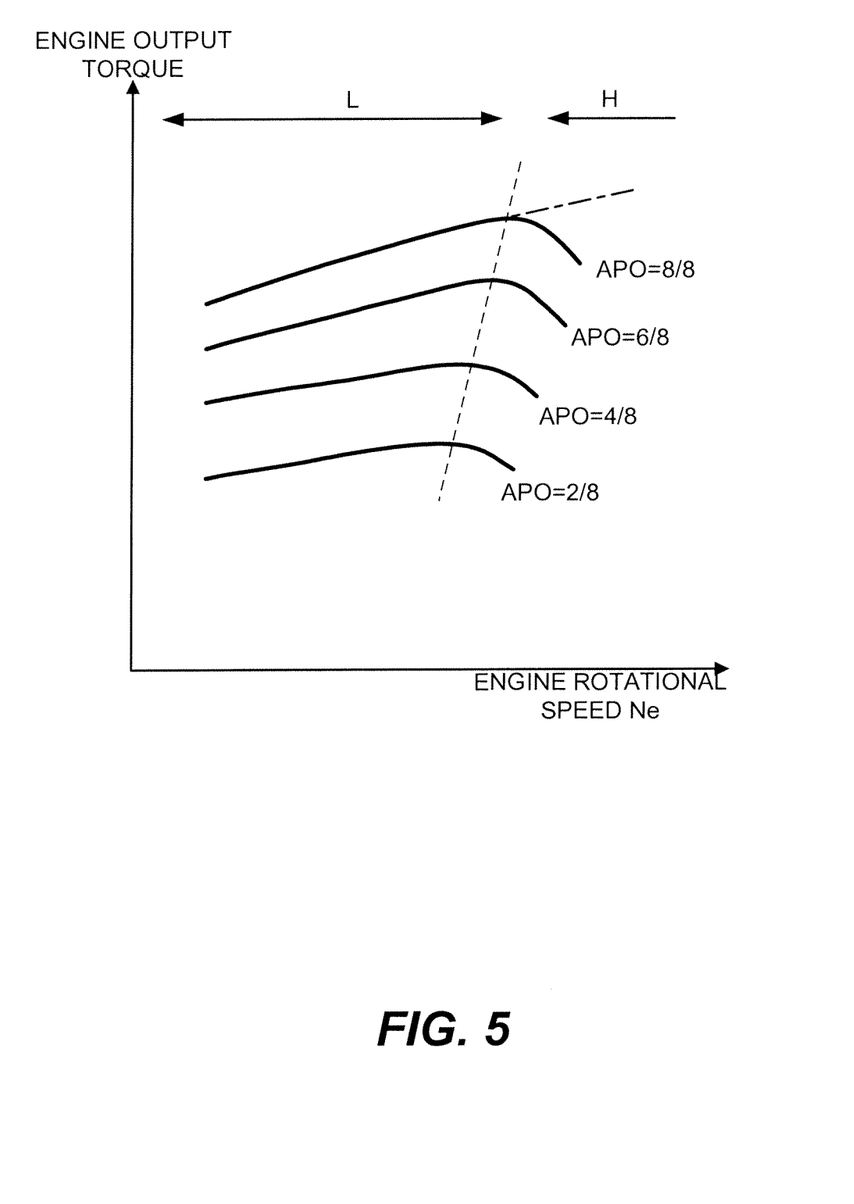
FIG. 5 is an explanatory diagram showing the relation between a rotational speed of the engine and output torque of the engine according to the embodiment of the present invention.

FIG. 5 is an explanatory diagram showing the relation between the engine rotational speed Ne and output torque of the engine 1 in the embodiment of the present invention. FIG. 5 shows the relation between the engine rotational speed Ne and output torque of the engine 1 when the accelerator opening degree APO falls in 2/8, 4/8, 6/8 and 8/8.

Output torque of the engine 1 increases in accordance with an increase of the engine rotational speed Ne (in L region shown in FIG. 5) and then output torque reaches a maximum in the vicinity of a predetermined rotational speed of the engine rotational speed Ne (as shown by a broken line in FIG. 5). For example, output torque is at its peak when the engine rotational speed Ne is in the vicinity of 4000 to 6000 rpm. Meanwhile, in a range in which the engine rotational speed Ne exceeds the predetermined rotational speed (i.e. H region shown in FIG. 5), output torque of the engine 1 decreases even though the engine rotational speed Ne increases.

Accordingly, when the engine rotational speed Ne exceeds a predetermined rotational speed, output torque of the engine decreases in spite of an increase of the engine rotational speed Ne, which explains why development of the vehicle speed VSP declines irrespective of an increase of the engine rotational speed Ne and a sense of acceleration is reduced.

Therefore, in order to prevent reduction of a sense of acceleration when acceleration is demanded by a driver, a threshold is set for the engine rotational speed Ne and in response to the engine rotational speed Ne which exceeds the threshold, the through speed ratio Ratio of the transmission 4 is shifted stepwise so as to be upshifted to a predetermined speed ratio. Therefore, the engine rotational speed Ne decrease once and the vehicle speed VSP can be increased again along with an increase of the engine rotational speed Ne.

More specifically, the transmission controller 12 stores the upshift determination map 52 in advance. Then, based on the relation between the accelerator opening degree APO and the primary rotational speed Npri, the transmission controller 12 determines whether or not the engine rotational speed Ne exceeds a threshold. When the engine rotational speed Ne exceeds a threshold, the second shift control is carried out to shift the through speed ratio Ratio of the transmission 4 stepwise for upshifting to a predetermined speed ratio.

Thus, the first shift control for suppressing a change of the speed ratio and the second shift control for upshifting the speed ratio are carried out and, in response to an acceleration demand, executed repeatedly so that a driver can obtain a sense of acceleration as the vehicle speed VSP increases in accordance with an increase of the engine rotational speed Ne.

Figure 6:
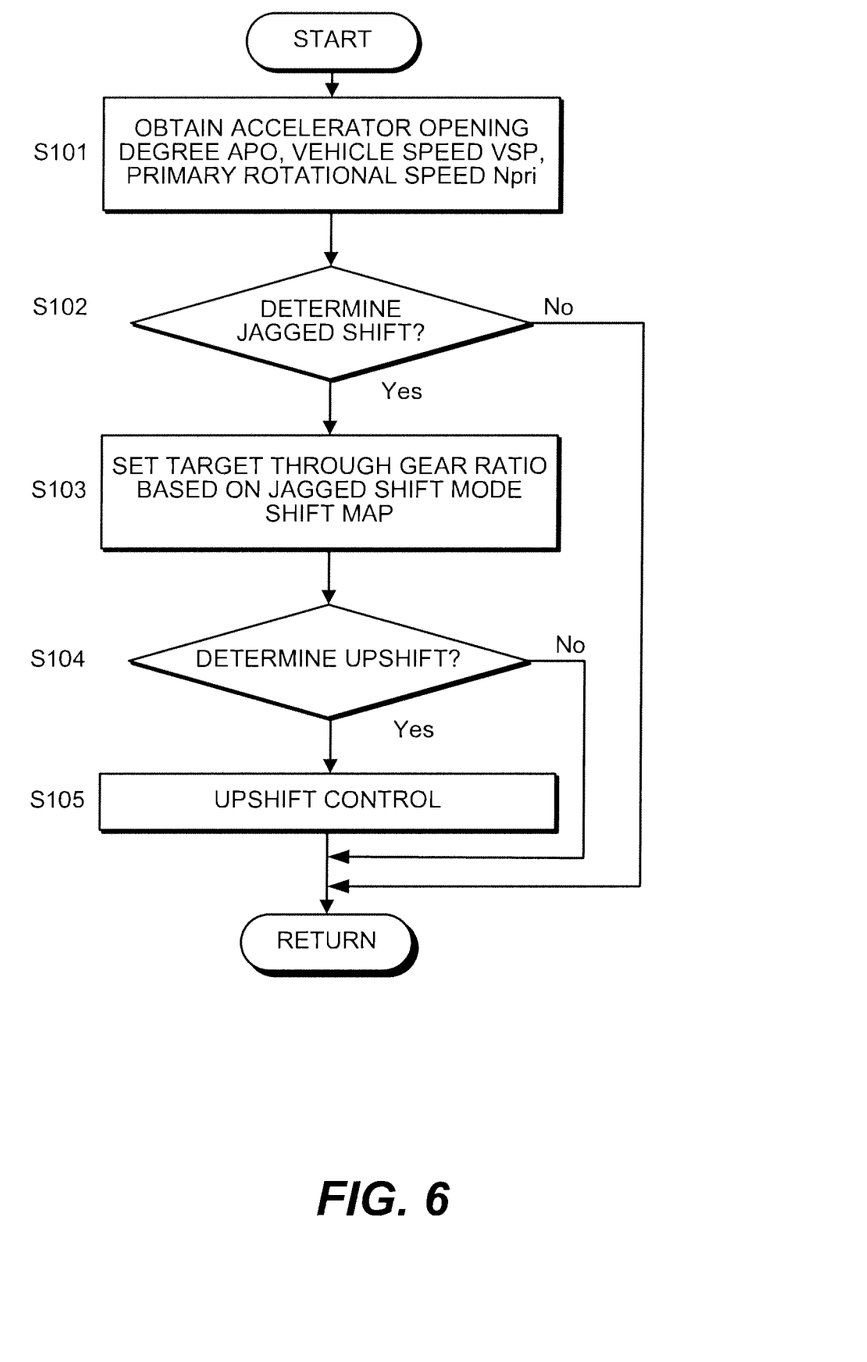
FIG. 6 is a flowchart of the jagged shift mode control to be executed by the transmission control device according to the embodiment of the present invention.

FIG. 6 is a flowchart of the jagged shift mode control to be executed by the transmission controller 12 according to the embodiment of the present invention.

The flowchart shown in FIG. 6 is executed in the transmission controller 12 by a predetermined period (e.g. every 10 ms) along with a regular shift control.

The transmission controller 12 obtains the accelerator opening degree APO, the vehicle speed VSP and the primary rotational speed Npri (S101).

Next, the jagged shift mode determination unit 50 of the transmission controller 12 gives a jagged shift decision to determine whether or not the jagged shift mode is the current mode from the accelerator opening degree APO, the vehicle speed VSP and the primary rotational speed Npri as obtained above (S 102). More specifically, when the accelerator opening degree APO is equal to or more than a predetermined opening degree (e.g. 5/8) and the accelerator opening speed dAPO is equal to or more than a predetermined opening speed (e.g. 5/8/s), the jagged shift mode is determined as the current mode.

When the jagged shift mode is not determined as the current mode, the process in the present flowchart is finished to return to a regular shift process.

Upon determination of the jagged shift mode, the process moves onto step S103 in which the target speed ratio setting unit 51 of the transmission controller 12 sets the target through speed ratio tRatio with reference to the jagged shift mode shift map 53. The transmission controller 12 commands the hydraulic control circuit 11 to set the through speed ratio Ratio to coincide with the target through speed ratio tRatio and controls the speed ratios of the variator 20 and the auxiliary transmission mechanism 30.

Next, the process moves onto step S104 in which an upshift judgment is given based on the upshift determination map 52 to determine whether or not an upshift should be carried out. More specifically, the transmission controller 12 refers to the upshift determination map 52, which has been stored therein in advance, in order to determine whether or not the engine rotational speed Ne exceeds a threshold based on the relation between the accelerator opening degree APO and the primary rotational speed Npri. The upshift determination map 52 used in the jagged shift mode is set so that the primary rotational speed Npri1 is upshifted to a much higher rotational speed than that of regular shifting.

When it is not determined to carry out an upshift, the process in the present flowchart is finished to return to a regular shift process.

When it is determined to carry out an upshift, the process moves onto step S105 in which the transmission controller 12 sets the target through speed ratio tRatio stepwise so as to be upshifted to a predetermined speed ratio. The transmission controller 12 commands the hydraulic control circuit 11 to set the through speed ratio Ratio to coincide with the target through speed ratio tRatio and controls the speed ratios of the variator 20 and the auxiliary shift mechanism 30. Thereafter, the process in the present flowchart is finished to return to a regular shift process.

Owing to such processes, a jagged shift is carried out.

By the way, when such a jagged shift is carried out, a problem arises as follows.

As stated above, when the engine rotational speed Ne exceeds a predetermined threshold (as shown by the broken line in FIG. 5), an upshift is carried out based on the upshift determination map 52.

Here, in a compact car equipped with a compact engine in which output torque of the engine 1 is relatively small, prolonged time is required for the engine rotational speed Ne to reach a predetermined threshold even if the accelerator opening degree AOP is large.

Since control is performed in the compact car to carry out an upshift when the engine rotational speed Ne exceeds the broken line shown in FIG. 5, a predetermined rotational speed is the ceiling for the engine rotational speed Ne according to the upshift determination map 52. Therefore, it is impossible to further increase the torque by using the engine rotational speed Ne in a much higher range (e.g. in a range immediately before over-revolution). That is, a period of time to continue a driving state in which a vehicle speed increases in accordance with an increase of the engine rotational speed Ne is made shorter without giving a sufficient sense of acceleration to a driver and a problem arises with reduction of acceleration feeling.

Therefore, the transmission controller 12 according to the embodiment of the present invention increases the engine rotational speed Ne as much as possible by making a control as follows in order to give a sense of acceleration to a driver and realize improvement of acceleration feeling.

Figure 7:
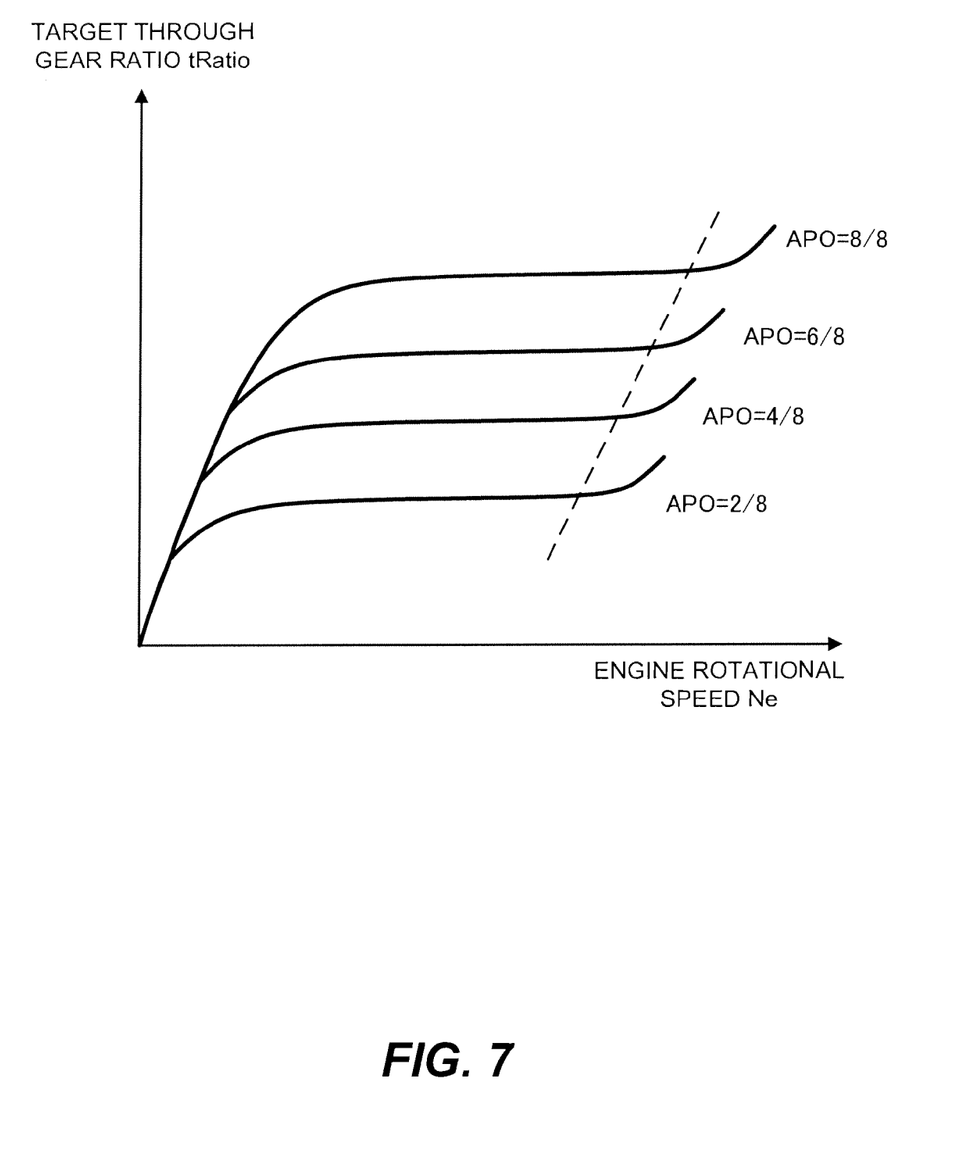
FIG. 7 is an explanatory diagram showing an example of a shift map of the jagged shift mode according to the embodiment of the present invention.

FIG. 7 is an explanatory diagram for one example of the jagged shift mode shift map 53 according to the embodiment of the present invention.

The jagged shift mode shift map 53 shown in FIG. 7 indicates shift lines corresponding to the target through speed ratio tRatio and the engine rotational speed Ne for respective values of the acceleration opening degree APO. FIG. 7 only shows a case when the accelerator opening degree APO falls in 2/8, 4/8, 6/8 and 8/8.

In the jagged shift mode shift map 53, each of the shift lines is substantially constant in the target through speed ratio tRatio in proportion to the engine rotational speed Ne and set to increase in the target through speed ratio tRatio in accordance with an increase of the engine rotational speed Ne in a range in which the engine rotational speed Ne is large (i.e. region to the right of a broken line shown in FIG. 7), or the speed ratio is changed to become lower in the range.

The region to the right of the broken line corresponds to the region in which output torque of the engine 1 decreases as opposed to an increase of the engine rotational speed Ne as described in FIG. 5 (i.e. H region). Changing the speed ratio to become lower in the shift lines is a change to compensate for a decline of torque in the H region.

More specifically, the upshift determination map 52 is modified to correspond to the jagged shift mode so that an upshift is carried out in a higher range of the engine rotational speed Ne (i.e. region to the right of the broken line shown in FIG. 5 or region to the right of the broken line shown in FIG. 7). Then, a shift control is made based on the jagged shift mode shift map 53. That is, on the assumption that the engine rotational speed Ne increases in proportion to time, a curved shift line corresponding to a decline of torque in the H region is set to shift the speed ratio to become lower and increase a change rate of the engine rotational speed Ne so that a torque change in the L region can be continuously realized in the H region in FIG. 5. By increasing a change rate of the engine rotational speed Ne, it is possible to increase torque as shown by a one-dot chain line in FIG. 5.

By thus setting the jagged shift mode shift map 53, the engine rotational speed Ne is further increased in a range in which output torque of the engine 1 decreases as opposed to an increase of the engine rotational speed Ne, whereby a sense of acceleration can be maintained by compensating for a decline of output toque of the engine 1.

Next, a shift control based on such a jagged shift mode shift map will be explained.

Figure 8:
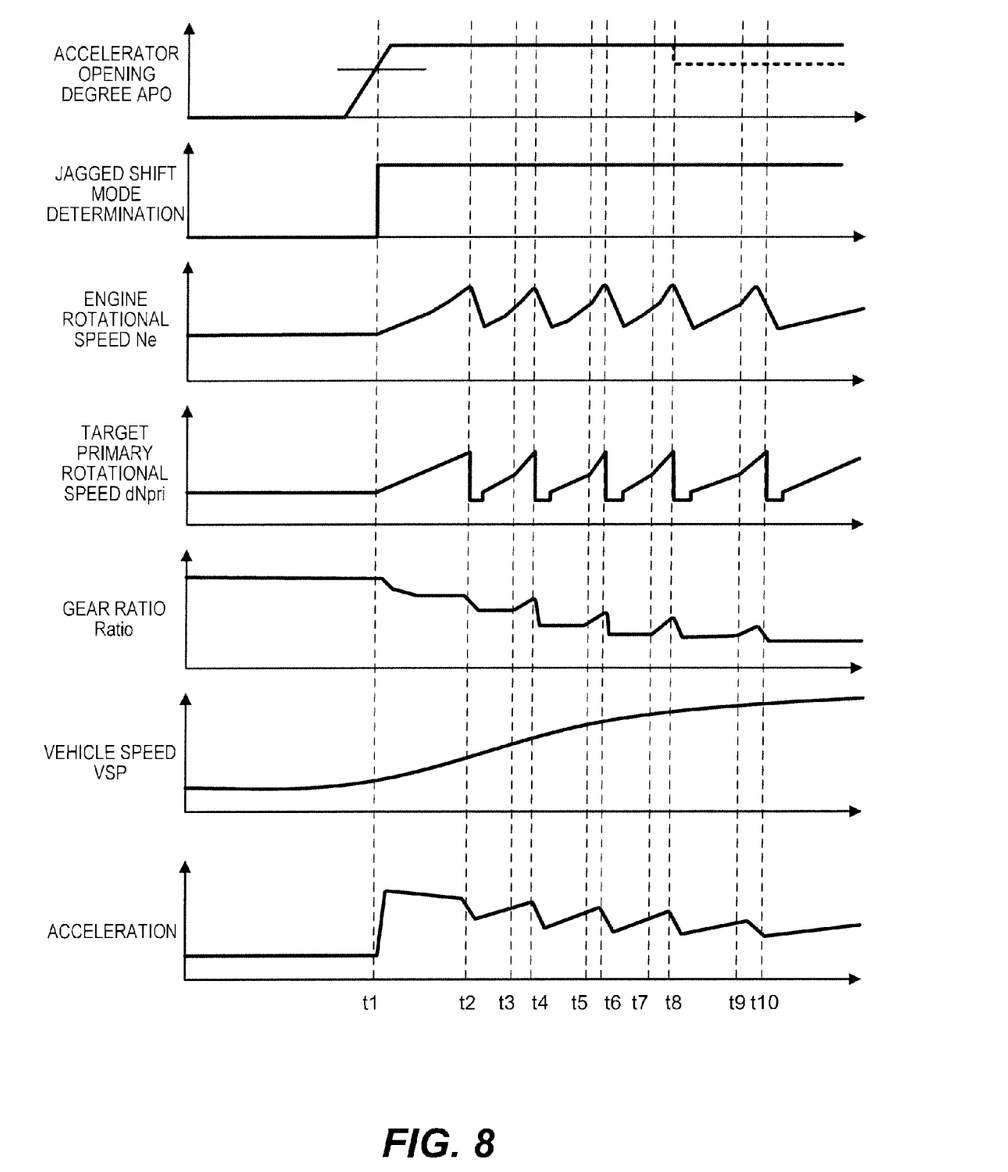
FIG. 8 is a time chart showing a shift control of the transmission control device according to the embodiment of the present invention.

FIG. 8 is a time chart showing a shift control made in the transmission 4 according to the embodiment of the present invention.

In FIG. 8, the accelerator opening degree AOP, a state of the jagged shift mode determination, the engine rotational speed Ne, the target primary rotational speed dNpri, the speed ratio Ratio, the vehicle speed VSP and acceleration of the vehicle are shown as time charts with time indicated in the horizontal axis. The target primary rotational speed dNpri is a control value based on the engine rotational speed Ne and the target through rotational speed tRatio.

As stated above, when an accelerator pedal is significantly stepped on by a driver and predetermined conditions are satisfied by the accelerator opening degree AOP and the accelerator opening speed dAPO, the transmission controller 12 gives a judgment that acceleration intended by a driver is large and determines transition to the jagged shift mode (at timing t1).

Upon transition to the jagged shift mode, the transmission controller 12 refers to the jagged shift mode shift map 53 to determine the target through speed ratio tRatio from the accelerator opening degree AOP and the vehicle speed VSP obtained currently. The transmission controller 12 makes a speed ratio control so that the current actual speed ratio Ratio follows the determined target through speed ratio tRatio. Here, the target primary rotational speed dNpri is calculated for the speed ratio control so that the primary rotational speed Npri follows the target primary rotational speed dNpri.

In the initial shift control in which the jagged shift mode was determined (at timings t1 to t2), the speed ratio is gradually changed so as not to cause an excessive behavior of the vehicle, followed by suppressing the speed ratio to be substantially constant.

Thereafter, when it is determined, in accordance with an increase of the engine rotational speed Ne, to carry out an upshift by the upshift determination map 52 based on the engine rotational speed Ne and the accelerator opening degree APO, the transmission controller 12 makes a control to upshift the speed ratio Ratio to a predetermined speed ratio by setting the target primary rotational speed dNpri based on the upshift (i.e. second shift control).

At this time, the transmission controller 12 undershoots the control by transiently setting the target primary rotational speed dNpri to become a lower rotational speed in order to enhance a response to a speed ratio change. Thereafter, a control is made based on the jagged shift mode shift map 53.

Although the engine rotational speed Ne decreases once at the timing t2, the speed ratio Ratio is then controlled based on the jagged shift mode shift map 53. Therefore, a change of the speed ratio is suppressed and a sense of acceleration can be obtained as the vehicle speed VSP increases in accordance with an increase of the engine rotational speed Ne.

In the jagged shift mode shift map 53, when the speed ratio falls in a range in which it is changed to become lower or in a region to the right of the broken line shown in FIG. 7, the speed ratio is changed to become lower based on the jagged shift mode shift map 53 (at timing t3). Therefore, the engine rotational speed Ne is increased and a sense of acceleration is maintained even in a range in which output torque of the engine 1 decreases.

Thereafter, the second shift control to make an upshift again based on the upshift determination map 52 (at timing t4) is carried out before carrying out the first shift control to control the speed ratio based on the jagged shift mode shift map 53 (at timings t4 to t6).

By thus repeating the second shift control (at timings t2, t4, t6, t8 and t10) and the first shift control (at timings t2 to t4, t4 to t6, t6 to t8 and t8 to t10), a driver can obtain a sense of acceleration as the vehicle speed VSP increases in accordance with an increase of the engine speed Ne (or an increase of the primary rotational speed Npri) based on the accelerator opening degree APO.

The transmission controller 12 determines a jagged shift based on the accelerator opening degree APO or an opening speed in returning an accelerator pedal (i.e. accelerator returning speed –dAPO). When the accelerator opening degree APO falls under a predetermined opening degree, or when the accelerator returning speed –dAPO exceeds a predetermined returning speed, the jagged shift mode is finished to return to a regular shift mode based on the shift map as shown in FIG. 3.

Even if a driver returns an accelerator pedal to some extent after stepping on the accelerator pedal, the jagged shift mode is continued. That is, a driver finely changes the amount of stepping on an accelerator pedal in response to behavior of the vehicle (such as speed, acceleration and engine sound). Therefore, unless an accelerator pedal is returned significantly, the jagged shift mode is continued on the assumption that acceleration is intended continuously.

For example, even if the accelerator opening degree APO is returned to some extent at timing t8 as shown by a broken line in FIG. 8 (e.g. the accelerator opening degree APO is returned only by 0.5/8), the jagged shift mode is continued by determining acceleration is intended continuously.

In the present embodiment, as shown in FIG. 7, shift lines corresponding to a decline of torque in the H region are set so that the speed ratio is shifted to become lower and a change rate of the engine rotational speed Ne is increased in the range in which output torque of the engine 1 decreases as opposed to an increase of the engine rotational speed Ne. In the region to the right of the broken line shown in FIG. 7, shift lines may be set to change the speed ratio in a curve form or shift lines may be set to change the speed ratio linearly.

Since output torque of the engine 1 varies depending on engine characteristics and a running state, it is not necessarily required to meet ideal torque characteristics and the present invention is characterized by having a mechanism to increase the engine rotational speed Ne to correspond to a torque decline.

In the second shift control, the target through speed ratio tRatio is set stepwise so as to be upshifted to a predetermined speed ratio. As for the degree of an upshift, the speed ratio is upshifted to an appropriate speed ratio so that a driver can obtain a sense of acceleration immediately after the first shift control.

In particular, when acceleration demanded by a driver is large, a control is made to upshift the speed ratio to become much higher and reduce the engine rotational speed Ne to become a lower rotational speed, followed by increasing the engine rotational speed Ne in the first shift control, whereby a greater sense of acceleration can be obtained.

As stated above, according to the embodiment of the present invention, the shift control device is mounted on a vehicle and provided with the transmission controller 12 serving as a shift control unit to control the speed ratio of the continuously variable transmission (i.e. variator 20) which continuously shifts and allows output of the rotational speed of the engine 1 serving as a driving power source, wherein the transmission controller 12 is configured to execute, based on a driving state of the vehicle such as, for example, an acceleration demand by a driver, the first shift control for suppressing a change of the speed ratio Ratio and the second shift control for upshifting the speed ratio Ratio to a predetermined speed ratio, and suppress a change of the speed ratio Ratio in the first shift control, followed by shifting the speed ratio to become lower before transition to the second shift control.

By thus making the first shift control for suppressing a change of the speed ratio and the second shift control for upshifting the speed ratio to a predetermined speed ratio, a sense of acceleration can be provided as a vehicle speed increases in accordance with an increase of the engine rotational speed. Further, before making a transition from the first shift control to the second shift control, the speed ratio is shifted to become lower and the engine rotational speed is transferred to become larger, whereby the engine rotational speed is increased in proportion to reduction of torque by shifting the speed ratio to become lower in a range in which torque generated by the engine decreases irrespective of an increase of the engine rotational speed, so that reduction of a sense of acceleration can be eliminated particularly even in the compact car equipped with the engine 1 whose output is small. This aspect corresponds to the effect of claim 1.

When output torque decreases as opposed to an increase of the rotational speed of the engine 1, the transmission controller 12 shifts the speed ratio to become lower in proportion to reduction of the output torque or at a predetermined shift speed in the first shift control, so that a sense of acceleration can be maintained by compensating for a decline of output torque of the engine 1 in a range in which output torque of the engine 1 decreases as opposed to an increase of the engine rotational speed Ne. This aspect corresponds to the effects of claims 2 and 3.

In the second shift control, the transmission controller 12 upshifts the speed ratio to a predetermined speed ratio after transiently commanding to shift the speed ratio to a higher speed ratio than the predetermined speed ratio, so that the shift speed is accelerated in the initial shifting to realize reduction of time spent for shifting without reducing a sense of acceleration. This aspect corresponds to the effect of claim 4.

The transmission controller 12 upshifts the predetermined speed ratio to become higher in the second shift control as acceleration intended by a is larger, wherein a control is made to increase the engine rotational speed Ne in the first shift control after decreasing the engine rotational speed Ne to a lower rotational speed, making it possible to obtain a greater sense of acceleration. This aspect corresponds to the effect of claim 5.

When the amount of returning the accelerator opening degree APO of the vehicle is not equal to or more than a predetermined amount of returning the opening degree (e.g. 0.5/8) or when the accelerator returning speed is not equal to or more than a predetermined returning speed (e.g. 0.5/8/S), the transmission controller 12 continuously carries out the first shift control and the second shift control, whereby the jagged shift mode can be continued without finishing it even though an accelerator pedal is returned to some extent. This aspect corresponds to the effect of claim 6.

When the accelerator opening degree APO is equal to or more than a predetermined opening degree and the accelerator opening speed dAPO is equal to or more than a predetermined opening speed, the transmission control device allows transition to the jagged shift mode so that a driving state can be provided such that a sense of acceleration is given to a driver when acceleration is intended by a driver.

Although the embodiment of the present invention is as stated above, the above embodiment is merely one of application examples of the present invention and not provided for the purpose of limiting the technical scope of the present invention to the concrete configuration of the above embodiment.

Although a control is made in the above embodiment to shift the speed ratio to become lower in response to a decline of torque due to an increase of the engine rotational speed Ne, it is not limited thereto. For example, a control may also be made to shift the speed ratio to become lower when torque is insufficient due to reduction of the engine rotational speed Ne. A control may also be made to shift the speed ratio to become lower in corresponding to reduction of a driving force expressed by multiplication of the engine rotational speed Ne and torque.

Although the variator 20 is provided as a belt-type continuously variable transmission mechanism in the above embodiment, the variator 20 may serve as a continuously variable transmission mechanism in which a chain is wound around the pulleys 21 and 22 in place of the V belt 23. Alternatively, the variator 20 may also serve as a toroidal-type continuously variable transmission mechanism in which a tiltable power roller is arranged in a space between an input disk and an output disk.

Although the auxiliary transmission mechanism 30 serves as a transmission mechanism having two forward shift stages including the first speed and the second speed, the auxiliary transmission mechanism 30 may also be a transmission mechanism having three or more forward shift stages. There may also be a configuration without arrangement of the auxiliary transmission mechanism 30.

Although the auxiliary transmission mechanism 30 is configured by using a Ravigneaux-type planetary gear mechanism, there is no limitation on such a configuration. For example, the auxiliary transmission mechanism 30 may be configured by combining a common planetary gear mechanism and a friction engagement element or may also be configured by a plurality of power transmission paths composed of a plurality of gear trains with different speed ratios and a friction engagement element to switch these power transmission paths.

Although the hydraulic cylinders 23a and 23b are provided to serve as actuators for displacing the movable conical plates of the pulleys 21 and 22 in the shaft direction, actuators are not limited to those driven hydraulically and may also be driven electrically.

This invention is not limited to the embodiment described above, and naturally includes various modifications and improvements within the scope of the technical spirit thereof.

This application claims priority from Japanese Patent Application No. 2012-61774 filed Mar. 19, 2012, which is incorporated herein by reference.

What we claimd is:

1. A shift control device for continuously variable transmission, being mounted on a vehicle and comprising a shift control unit to control a speed ratio of a continuously variable transmission for continuously shifting and allowing output of a rotational speed of a driving power source, wherein
the shift control unit is adapted to:
execute, in a driving state of the vehicle involving reduction of output torque of the driving power source in accordance with an increase of the rotational speed of the driving power source, a first shift control for suppressing a change of the speed ratio or a second shift control for upshifting the speed ratio to a predetermined speed ratio; and
in the first shift control, after suppressing a change of the speed ratio, shift the speed ratio to become lower in proportion to reduction of the output torque before executing the second shift control.

2. The shift control device for continuously variable transmission according to claim 1, wherein
the shift control unit is adapted to:
in the driving state of the vehicle involving reduction of output torque of the driving power source in accordance with the increase of the rotational speed of the driving power source, in the first shift control, shift the speed ratio to become lower at a predetermined shift speed.

3. The shift control device for continuously variable transmission according to claim 1, wherein
the shift control unit is adapted to give, in the second shift control, after giving a command of shifting the speed ratio to become higher than the predetermined speed ratio, a command of shifting the speed ratio to the predetermined speed ratio.

4. The shift control device for continuously variable transmission according to claim 1, wherein
the shift control unit is adapted to upshift, in the second shift control, the predetermined speed ratio to become higher as acceleration intended by a driver increases.

5. The shift control device for continuously variable transmission according to claim 1, wherein
the shift control unit adapted to execute the first shift control or the second shift control in the event of the amount of returning the opening degree of an accelerator pedal of the vehicle failing to be equal to or more than a predetermined amount of returning the opening degree or in the event of the returning speed of the accelerator pedal failing to be equal to or more than a predetermined returning speed.

6. The shift control device for continuously variable transmission according to claim 1, wherein
the shift control unit is adapted to execute the first shift control or the second shift control when the opening degree of an accelerator pedal of the vehicle is equal to or more than a predetermined opening degree and the opening speed of the accelerator pedal of the vehicle is equal to or more than a predetermined opening speed.

7. A shift control method for controlling a speed ratio of a continuously variable transmission for continuously shifting and allowing output of a rotational speed of a driving power source, comprising:
executing, in a driving state of a vehicle involving reduction of output torque of the driving power source in accordance with an increase of the rotational speed of the driving power source, a first shift control for suppressing a change of the speed ratio or a second shift control for upshifting the speed ratio to a predetermined speed ratio, and
in the first shift control, after suppressing a change of the speed ratio, shifting the speed ratio to become lower in proportion to reduction of the output torque before executing the second shift control.

8. A shift control device for continuously variable transmission, being mounted on a vehicle and comprising shift control means for controlling a speed ratio of a continuously variable transmission for continuously shifting and allowing output of a rotational speed of a driving power source, wherein the shift control means executes, in a driving state of the vehicle involving reduction of output torque of the driving power source in accordance with an increase of the rotational speed of the driving power source, a first shift control for suppressing a change of the speed ratio and a second shift control for upshifting the speed ratio to a predetermined speed ratio, and in the first shift control, after suppressing a change of the speed ratio, shifts the speed ratio to become lower in proportion to reduction of the output torque before executing the second shift control.

* * * * *